Figure 1:
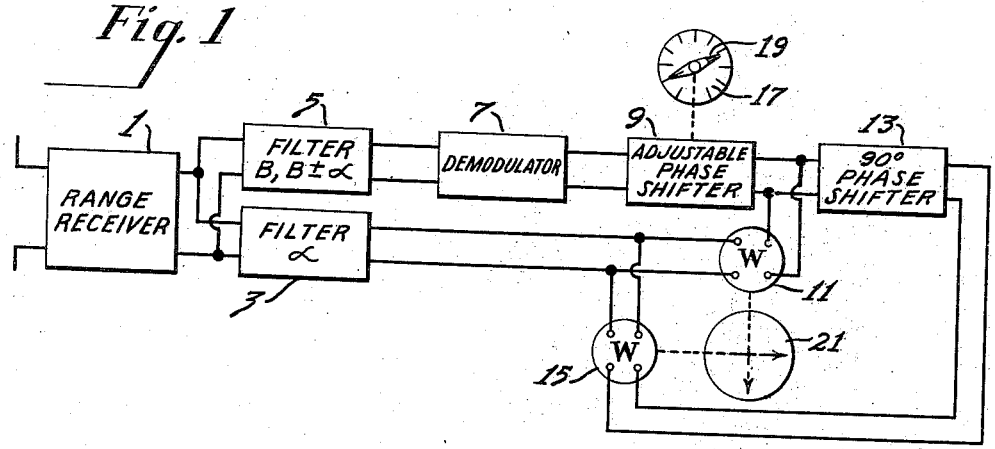

Feb. 24, 1948.                D. G. C. LUCK                2,436,479
                    COURSE INDICATOR SYSTEM FOR RADIO RANGE
                            Filed Dec. 22, 1945

INVENTOR
David G. C. Luck
BY
ATTORNEY

Patented Feb. 24, 1948

2,436,479

UNITED STATES PATENT OFFICE 2,436,479

COURSE INDICATOR SYSTEM FOR RADIO RANGES

David G. C. Luck, Princeton, N. J., assignor to Radio Corporation of America, a corporation of Delaware Application December 22, 1945, Serial No. 636,970

8 Claims. (Cl. 250—11)

This invention relates to improvements in radio aids to the navigation of aircraft, and more particularly to course indicator systems for use with omnidirectional radio ranges.

In general, the omnidirectional range radiates two signals: one which varies in some characteristic, such as phase, in accordance with the bearing from the range, and another which does not vary, but serves as a reference for comparison with the first. The range signals are received on the aircraft, where they are compared with each other to provide direct indication of the bearing of the craft from the range station. A typical omnidirectional range system is described in U. S. Patent No. 2,253,958.

For flight along a radial line through the range station, it is desirable to have an indicator of the familiar "left-right" type to show any deviation of the craft from the desired course. Such indicator systems have been devised for use with omnidirectional ranges. A typical one is described in U. S. Patent No. 2,208,377. Although the system in said patent is intended for use with a range providing a pulse reference signal instead of a sinusoidal reference signal, it will operate with either.

Systems like that described in said Patent No. 2,208,377 necessarily include some sort of course bearing selector which is manually adjustable to correspond to the bearing of the course to be followed. As long as the aircraft is flying along the selected course, the left-right indicator reads zero, or "on course." This is true whether the craft is flying toward or away from the range station.

Likewise, the left-right indicator will read zero in most systems when the flight is on course whether the course bearing selector is set for the desired course, or for the reciprocal of the desired course bearing. With one setting, deviation of the craft to the right of the desired course will cause deflection of the L.-R. meter in one direction, while with the other setting, deviation to the right will cause deflection of the L.-R. meter in the opposite direction. Since the craft must be appreciably off course to deflect the meter either way (i. e. merely turning the airplane momentarily will not deflect the meter), the ambiguity can cause confusion.

It is the principal object of the instant invention to provide an improved method of and means for resolving the above-described ambiguities.

Another object is to provide an improved course indicator system wherein a unitary indication of deviation from course and of sense of bearing setting is provided on the face of a single instrument.

A further object is to provide a system of the described type affording a unitary indication in which the flight rules are the same whether the selected course is toward or away from the range, and to which the pilot can react properly with a minimum of mental effort.

A further object of the present invention is to provide a system of the described type which employs the usual crossed-pointer indicator meter of an instrument landing system. Since it is not necessary to use both the course indicator and the instrument landing system at the same time, the same meter may be used for both purposes.

Figure 2:
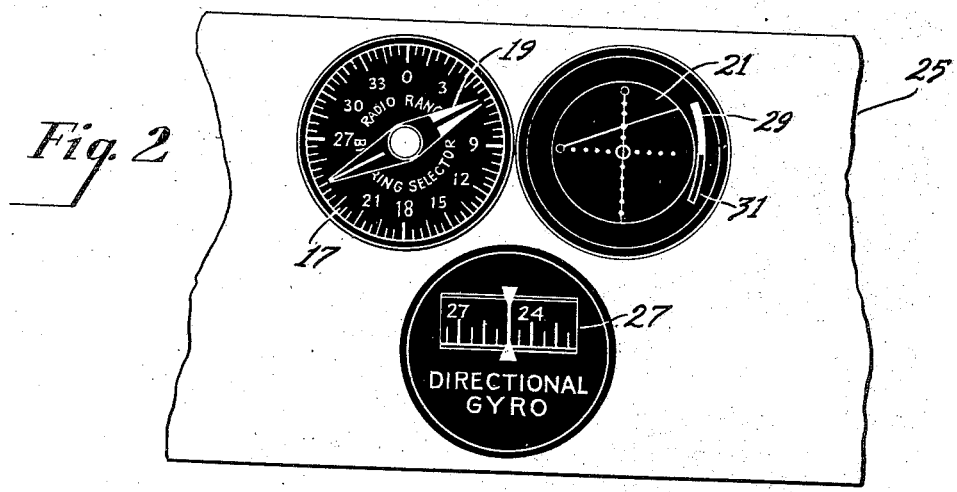
Figure 3:
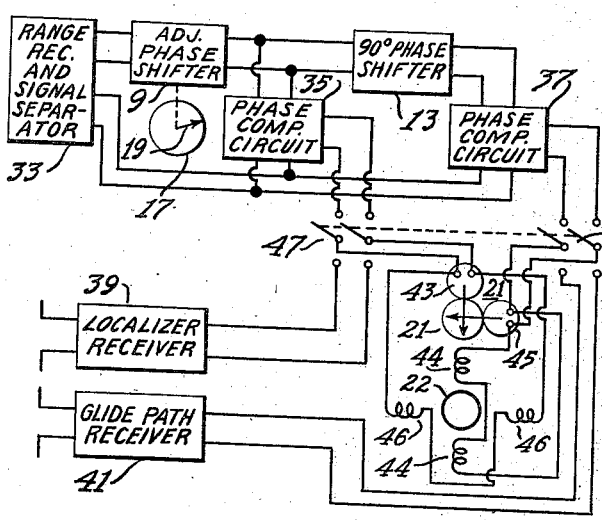

The invention will be described with reference to the accompanying drawing, wherein:

Figure 1 is a schematic block diagram of a course indicator system embodying the present invention, Figure 2 is an elevation of a portion of an airplane instrument panel, showing the indicators used in the practice of the invention, and Figure 3 is a schematic diagram of a modification of the system of Figure 1, in combination with the indicator system of a radio instrument landing system.

For the purpose of illustration of the present invention, an omnidirectional range of the type described in the aforementioned Patent No. 2,253,958 is assumed. Refer to Figure 1. The beacon itself is not shown. It is sufficient for the present explanation to state that the beacon radiates a single carrier with variable phase modulation of one frequency $\alpha$ and a subcarrier modulation of frequency $\beta$ modulated in turn with a constant phase signal of frequency $\alpha$.

The equipment to be carried on an aircraft includes a radio receiver 1 capable of receiving the doubly modulated range signal. A filter 3 separates the variable phase signal of frequency $\alpha$ from the receiver output, and a second filter 5 separates the subcarrier of frequency $\beta$, together with its constant phase sidebands of frequencies $\beta+\alpha$ and $\beta-\alpha$.

The modulated subcarrier signal is demodulated by a demodulator 7, providing a constant phase output of frequency $\alpha$. This is the reference phase voltage, and is applied through an adjustable phase shifter 9 to one pair of terminals of a wattmeter 11. The output of the filter 3, hereinafter referred to as the directional phase voltage is applied to the other pair of terminals of the wattmeter 11.

The reference phase output of the phase shifter 9 is applied through a 90° phase shifter 13 to one pair of terminals of a second wattmeter 15. The other pair of terminals of the wattmeter 15 is connected to the filter 3. The adjustable phase shifter 9 is provided with a scale 17, calibrated in degrees, and a pointer 19 for indicating the bearing of the course selected by adjustment of the phase shifter 9.

The wattmeters 11 and 15 are arranged with their pointers crossing over a common dial. The meters 11 and 15 are provided with restoring springs or other bias means adjusted so that their zero indications are central, with the pointers crossing each other at right angles.

In the operation of the system of Figure 1, the phase relationship between the directional phase output of the filter 3 and the reference phase output of the demodulator 7 depends on the bearing of the receiver from the range transmitter. For example, if the aircraft is due east of the range transmitter (90° bearing), the directional signal leads the reference signal by 90°.

Now suppose it is desired to fly toward the range station, on a course bearing 45 degrees. The phase shifter is adjusted to provide a phase lead in the reference signal of 90° plus 45°, or 135°. The dial 17 is arranged so that with this adjustment, the pointer 19 indicates 45°. When the airplane is on the 45° course line, the output of the filter 3 will be 45° ahead of that of the demodulator 7, and hence 90° behind the output of the phase shifter 9. Thus the two inputs to the wattmeter 11 are 90° out of phase with each other, and the meter reads zero, or "on course."

If the airplane should get off course to the right, i. e. to the north of the selected 45° course since it is flying toward the range, the output of the filter 3 would be less than 45° ahead of that of the demodulator 7, and thus more than 90° behind that of the phase shifter 9, causing the wattmeter 11 to deflect to the right. Similarly, the meter 11 will deflect to the left if the plane is south of the selected 45° course.

The output of the phase shifter 9 is shifted a further 90° by the 90° phase shifter 13. Although this shift could be in either direction, let us assume that it is an advance in phase. The output of the phase shifter 13 then leads that of the demodulator 9 by a total of 135°+90°, or 225°. When the plane is on course, the output of the filter 3 leads that of the demodulator 7 by 45°, and is thus 180° behind that of the phase shifter 13. This causes a maximum upward deflection of the pointer of the wattmeter 15, indicating that the range is ahead on the 45° course.

As flight is continued along the selected course, the meter 15 will continue to be deflected upward until the range station is reached. When the craft passes over the range station, the directional phase signal reverses in phase, to lead the reference phase output of the demodulator 7 by 225°. This reversal in phase appears at the outputs of the phase shifters 9 and 13.

The two inputs to the wattmeter 11 will still be 90° out of phase with each other, and the meter 11 will continue to read zero, indicating that the craft is still on an extension of the original 45° course. The two inputs to the wattmeter 15 will now be in phase instead of 180° out of phase, causing it to deflect its pointer downward and indicate that the range is behind, as far as the 45° course is concerned.

The left-right indications will still be correct for continuation of the flight away from the range, on the reciprocal of the originally selected inbound course; i. e. if the plane gets off to the north, the meter 11 will deflect to the right. Thus no ambiguity arises as to the actual direction of the course being flown, or as to the direction of any deviation from said course.

If it is desired, for example, to fly back toward the range in the other direction along the same course line, the phase shifter 9 is adjusted to make the indicator 17, 19, read 225°, the actual bearing of the desired course. It will be apparent without further detailed explanation that this would cause the meter 15 to deflect upward, indicating "range ahead," and will reverse the sense of the left-right indications to conform with flight in the desired direction.

Referring to Figure 2, the course bearing selector indicator 17, 19 and the crossed pointer indicator 21 are mounted adjacent each other on an airplane instrument panel 25, preferably near a compass indicator 27. The bearing selector pointer 19 is double ended, with one end black and the other white, for example. The side of the indicator face 21 is marked with a white sector 29 above the center position of the pointer of the meter 15, and a black sector 31 below the center position.

With this arrangement, white is always associated with flying toward the range, and black is always associated with flying away from the range. Thus, to fly a course toward the range, the white end of the pointer 19 is set to the bearing from the range of the desired line of flight. When on course, the pointer of the meter 11 will be centered and the pointer of the meter 15 will be in the upper (white) or range-ahead sector.

Similarly, for radial flight away from the range, the black end of the pointer 19 is set to the bearing from the range of the desired line of flight. When on course, the L.-R. pointer is centered and the pointer of the meter 15 is in the black sector. When used to determine bearings for a position "fix," the selector 17 is adjusted to center the meter 11, the sector color indicated by meter 15 is noted, and the bearing is read against the similarly colored end of pointer 19.

It should be noted that the range indicators show merely the angular position with respect to a meridian of the line through the range station and the craft, and do not give any indication of the actual heading of the airplane. This information is provided by the compass 27. For radial flight through the range, the airplane is always turned so that its compass heading, indicated by the compass 27, agrees approximately with the indication of the black end of the selector pointer 19.

In radial flight, correction for deviations from the desired course is made at all times by turning the airplane slightly toward the decentered vertical pointer of the crossed-pointer indicator 21.

A system of the above-described type can be combined conveniently with blind landing equipment, affording double use of the crossed-pointer indicator. Refer to Figure 3, wherein the range receiver and the means for separating the reference and directional phase signals are represented by a single block 33. In the modification of Figure 3, phase comparison circuits 35 and 37 are substituted for the wattmeters 11 and 15. These circuits may be of the balanced-modulator type, like that shown in Figure 2 of the above-mentioned U. S. Patent No. 2,208,377, or any other known devices providing D.-C. outputs of magnitude and polarity depending upon the phase relationship between two A.-C. inputs.

The aircraft equipment includes an instrument landing system comprising a localizer receiver 39 and a glide path receiver 41, designed in accordance with known practice to respond to respective beacon transmitters (not shown). The localizer receiver 39 provides D.-C. output of one polarity when the airplane is to the right of a predetermined glide path, and output of the opposite polarity when the craft is to the left of the glide path. Similarly, the receiver 41 provides output of one polarity or the other when the plane is respectively above or below the glide path.

The indicator 21 in the system of Figure 3 is provided with two D.-C. meter movements 43 and 45, with pointers normally centered vertically and horizontally respectively. The meter 43 is connected to a double-throw switch 47, through which it may be connected selectively to the phase comparison circuit 35 or to the localizer receiver 39. The meter 45 is connected to a similar switch 49, for connection to the phase comparison circuit 37 or the glide path receiver 41. The switches 49 and 47 are mechanically ganged to switch both meters together. Thus the crossed pointer indicator may be used either for blind landing, or for the above-described omnidirectional range indications. A cathode ray oscilloscope tube 22 may be used instead of the meters 43 and 45, with its horizontal and vertical deflection means 44 and 46 connected respectively to the phase comparison circuits 35 and 37. With this arrangement, the indication is in the form of a luminous spot, at a position on the cathode ray screen corresponding generally to the position of the intersection of the pointers of the meters 43 and 45 on the dial 22.

It has been assumed that the output of the glide path receiver is zero when the airplane is on the glide path. Some glide path systems, such as those based on following a line of constant signal strength, provide a predetermined constant output when the craft is on the proper path, and more output or less output when the craft deviates above or below said path. It will be apparent to those skilled in the art that such systems can be adapted to the system of Figure 3 by providing an auxiliary source of bias, for example, with the glide path receiver 41, to cause central indication by the meter 45 when the craft is on the correct glide path.

I claim as my invention:

1. In a course indicator for omnidirectional radio ranges, including means providing a reference phase signal and a directional phase signal, and course bearing selector means for shifting the phase of one of said signals in accordance with the bearing of a predetermined course, visual indicator means for said bearing selector comprising a scale and pointer providing both direct and reciprocal bearing indications and having two differently marked portions for providing visual distinguishability between said direct and reciprocal indications, a unitary indicator device including two orthogonally related pointers and respective deflection means, means responsive to the phase relationship between said phase shifted signal and the other of said first-mentioned signals to actuate one of said deflection means to deflect one of said orthogonal pointers to show deviation from said course, means responsive to the phase relationship between said two last-mentioned signals to actuate the other of said deflection means to deflect the other of said two orthogonal pointers to show the sense of said course, said indicator means including, in cooperative relationship with said last-mentioned pointer, a scale having two portions differently marked like respective differently marked portions of said bearing indicator means.

2. In a course indicator system for omnidirectional radio ranges, including means providing a reference phase signal and a directional phase signal, and course bearing selector means for shifting the phase of one of said signals in accordance with the bearing of a predetermined course, visual indicator means for said bearing selector comprising a scale and pointer providing both direct and reciprocal bearing indications and having two differently marked portions for providing visual distinguishability between said direct and reciprocal indications, indicator means responsive to the phase relationship between said phase shifted signal and the other of said first-mentioned signals to show deviation from said course, and further indicator means responsive to the phase relationship between said two last-mentioned signals to show the sense of said course, said last-mentioned indicator means including two portions differently marked like respective differently marked portions of said bearing indicator means.

3. In a course indicator system for omnidirectional radio ranges, including means providing a reference phase signal and a directional phase signal, and course bearing selector means for shifting the phase of one of said signals in accordance with the bearing of a predetermined course, visual indicator means for said bearing selector comprising a scale and pointer providing both direct and reciprocal bearing indications and having two differently marked portions for providing visual distinguishability between said direct and reciprocal indications, indicator means responsive to the phase relationship between said phase shifted signal and the other of said first-mentioned signals to show deviation from said course, and further indicator means responsive to the phase relationship between said two last-mentioned signals to show the sense of said course, said last-mentioned indicator means including two portions differently marked like respective differently marked portions of said bearing indicator means.

4. In a combined course indicator for omnidirectional radio ranges and glide path indicator for instrument landing systems, means providing a reference phase signal and a directional phase signal, and a course bearing selector for shifting the phase of one of said signals in accordance with the bearing of a predetermined course, means responsive to the phase relationship between said phase shifted signal and to the other of said first-mentioned signals to provide a voltage varying in accordance with deviation from said course, means responsive to the phase relationship between said last-mentioned two signals to provide a second voltage of polarity depending upon the sense of said course, glide path receiver means providing two further voltages varying in accordance with deviation horizontally and vertically respectively from a predetermined glide path, a unitary indicator device including two orthogonally related deflection means, and means for selectively applying said first pair of said voltages or said second pair of voltages respectively to said deflection means.

5. In a course indicator system for omnidirectional radio ranges, including means providing a reference phase signal and a directional phase signal, and course bearing selector means for shifting the phase of one of said signals in accordance with the bearing of a predetermined course, visual indicator means for said bearing selector comprising a scale and pointer providing both direct and reciprocal bearing indications and having two differently marked portions for providing visual distinguishability between said direct and reciprocal indications, a unitary indicator device including two orthogonally related deflection means, means responsive to the phase relationship between said phase shifted signal and the other of said first-mentioned signals to actuate one of said deflection means to show deviation from said course, means responsive to the phase relationship between said two last-mentioned signals to actuate the other of said deflection means to show the sense of said course, said indicator means including, in cooperative relationship with said last-mentioned deflection means, two portions differently marked like respective differently marked portions of said bearing indicator means.

6. In a course indicator system for omnidirectional radio ranges, including means providing a reference phase signal and a directional phase signal, and a course bearing selector for shifting the phase of one of said signals in accordance with the bearing of a predetermined course, a unitary indicator device including two orthogonally related deflection means, means responsive to the phase relationship between said phase shifted signal and to the other of said first-mentioned signals to actuate one of said deflection means to show deviation from said course, and means responsive to the phase relationship between said last-mentioned two signals to actuate the other of said deflection means to show direction of travel along said course.

7. A system for indicating the phase relationship between two alternating voltages comprising a unitary indicator device having two pointers crossing each other and normally centered vertically and horizontally respectively, means responsive to difference in phase between said two voltages to deflect one of said pointers, means for shifting the phase of one of said voltages by 90°, and means responsive to difference in phase between said phase shifted voltage and the other of said first-mentioned voltages to deflect the other of said pointers.

8. A system for indicating the phase relationship between two alternating voltages comprising a unitary indicator device having a single face and two orthogonally related deflection means, means responsive to difference in phase between said two voltages to actuate one of said deflection means, means for shifting the phase of one of said voltages 90°, and means responsive to difference in phase between said phase shifted voltage and the other of said first-mentioned voltages to actuate the other of said deflection means.

DAVID G. C. LUCK.